United States Patent [19]

Meline

[11] Patent Number: 4,976,648
[45] Date of Patent: Dec. 11, 1990

[54] ELK CALL

[76] Inventor: Ralph E. Meline, 880 Sunshine La., Coos Bay, Oreg. 97420

[21] Appl. No.: 421,946

[22] Filed: Oct. 16, 1989

[51] Int. Cl.⁵ ............................................. A63H 5/00
[52] U.S. Cl. .................................... 446/207; 446/397
[58] Field of Search ................. 446/69, 202, 204, 207, 446/208, 209, 213, 216, 397, 404, 416

[56] References Cited

U.S. PATENT DOCUMENTS

| | | | |
|---|---|---|---|
| 620,037 | 2/1899 | Johnson | 446/204 |
| 747,078 | 12/1903 | Leipold | 446/202 |
| 752,447 | 2/1904 | Gebert | 446/209 |
| 805,727 | 11/1905 | Howe | 446/209 |
| 1,353,864 | 9/1920 | Thomassian | 446/209 |
| 2,198,993 | 4/1940 | Felgner | 446/209 |
| 2,256,925 | 9/1941 | McCoy | 446/202 |
| 2,460,716 | 2/1949 | Shurley | 446/208 |
| 2,512,313 | 6/1950 | Dritz | 446/204 |
| 2,969,611 | 1/1961 | Warren, Jr. | 446/202 |
| 3,583,094 | 6/1971 | Tribell | 446/202 |
| 3,722,133 | 3/1973 | Morgan | 446/202 |
| 3,738,056 | 6/1973 | Schultz | 446/202 |
| 3,811,221 | 5/1974 | Wilt | 446/202 |
| 3,815,283 | 6/1974 | Piper | 446/202 |
| 4,335,539 | 6/1982 | Jones | 446/204 |
| 4,637,154 | 1/1987 | Laubach | 43/1 |
| 4,761,149 | 8/1988 | Laubach | 446/208 |
| 4,764,145 | 8/1988 | Kirby | 446/208 |

Primary Examiner—Robert A. Hafer
Assistant Examiner—D. Neal Muir
Attorney, Agent, or Firm—James D. Givnan, Jr.

[57] ABSTRACT

The call includes an elongate tubular body having a rim structure defining an elliptical air inlet end. An elastic sheet constitutes a reed and overlies a portion of the inlet end of the body. A backing plate is also located at the inlet end with a plate tongue offset below the elastic sheet. The rim structure is shaped so as to support a span of the elastic sheet in spaced relationship to the backing plate which is received on a recessed portion of the rim structure and held in place by the elastic sheet. An O-ring secures the sheet in place. An adapter adjacent the outlet end of the tubular body permits attachment of a sound absorbent tube for sound modulation. A baffle within the adapter provides an airflow restriction. The backing plate is removably mounted on the tubular body of the call and allows backing plate of different configurations to be used to alter the pitch of the call.

16 Claims, 1 Drawing Sheet

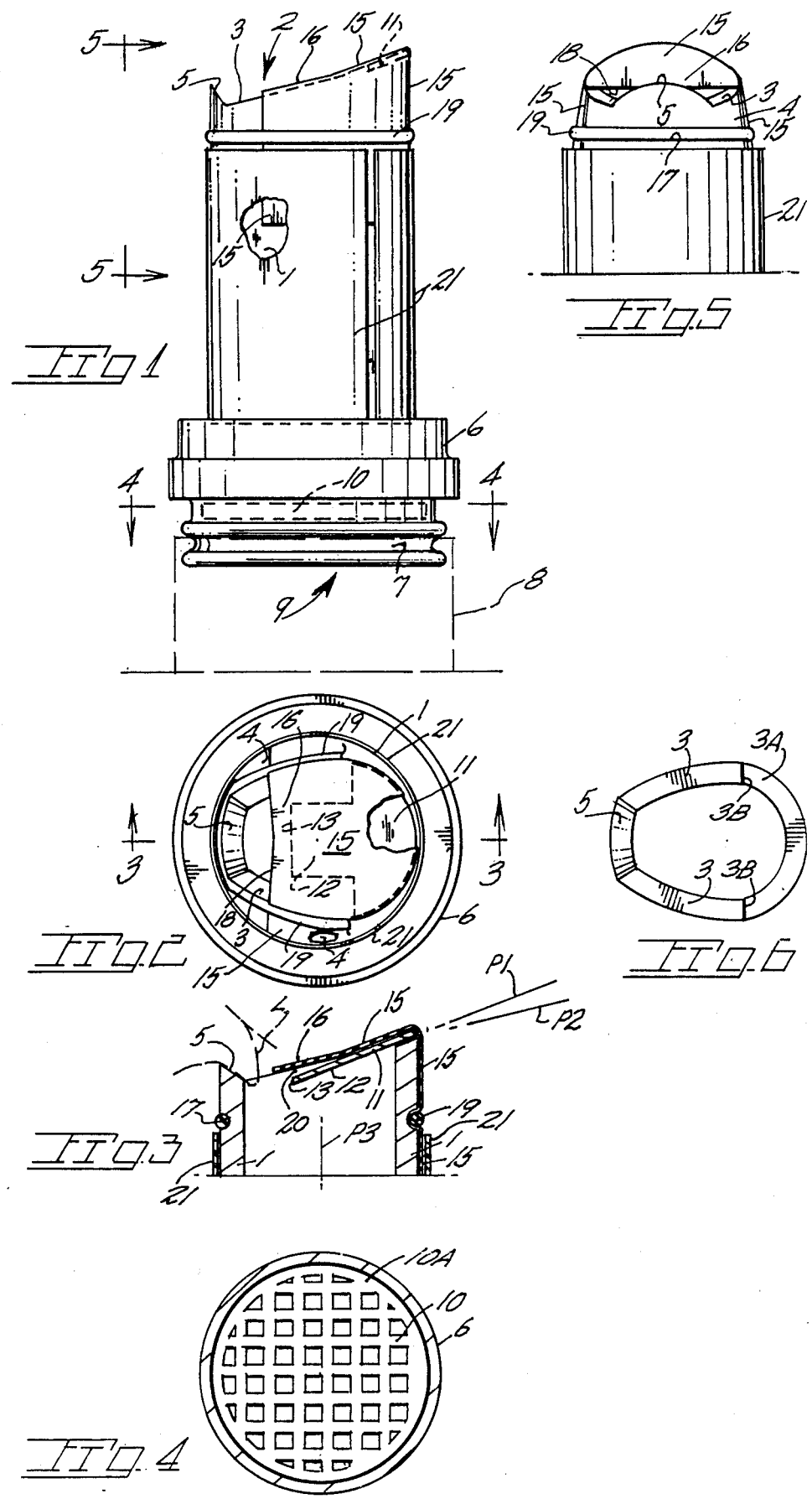

ELK CALL

BACKGROUND OF THE INVENTION

The present invention pertains generally to animal calls used by hunters and other outdoorsmen to attract game.

In the pursuit of large game, such as elk, it is highly advantageous to use a call to simulate the various sounds emitted by the animal. This is particularly so when hunting with a bow and stalking game for a short range kill. As elk and other large game animals make a wide array of sounds or calls, it is important that not only the simulation be a true one but that the hunter be able to render several different calls.

In the prior art is a call described in U.S. Pat. No. 4,764,145 which utilizes a tubular body having a chordally shaped closure at one end and a resonant membrane laterally offset from the closure to provide opposed, spaced apart, rigid and pliable edges past which air moves during call use. The resonant membrane and a medial plane of the call body define an obtuse included angle. The tube mouthpiece of the tubular body of the call is of circular configuration. Sounds simulating wildlife calls are achieved with the user using a hand to open and close the outlet end of the tubular call. U.S. Pat. No. 3,722,133 discloses a similar call but with the chordally shaped closure and the resonant membrane being coplanar. A sound absorbent member is located adjacent the outlet end of the call as a substitute for restricting the outlet end with the user's finger. U.S. Pat. Nos. 4,637,154 and 4,761,149 show calls with elastic vibratory bands stretched across an airway. U.S. Pat. No. 2,969,611 shows a call wherein an elastic membrane is confined across a cap defined air inlet. U.S. Pat. No. 2,256,925 shows a noisemaking device wherein a flap flexes to open and close against an annular ring to produce loud sounds.

SUMMARY OF THE PRESENT INVENTION

The present invention is embodied in a game call wherein a membrane is superimposed on a membrane backing plate to partially close the inlet end of the call.

A tubular body of the call has a first or inlet end against which the lips are placed. A membrane partially overlies said inlet end with a ridge on the inlet end serving to assure proper positioning of the user's lower lip on the call. The backing plate at the inlet end of the call defines, along with the membrane, a space which permits unobstructed membrane movement during call use. The membrane is held in snug engagement with the inlet end of the call to close the above noted space by contact with the inlet end rim. A recessed segment of an inlet end rim receives the membrane backing plate which is held in place by the membrane. A baffle restricts airflow through the tubular body of the call while an adapter at the second or outlet end of the call serves to permit snap-on attachment of a sound absorbent tube to lower the pitch of certain calls.

Important objectives include the provision of an animal call having a resonant membrane overlying a membrane backing plate in a spaced apart manner to define an airspace therebetween; the provision of an animal call wherein a backing plate is in superimposed rested placement on the inlet end of the tubular call; the provision of an animal call wherein a resonant membrane and a backing plate cooperate to define a chamber within which the membrane vibrates with the plate and membrane having adjacent free edges; the provision of an animal call with a membrane and backing plate located at the inlet end of the call which is of oval shape with a baffle for desired airflow across the membrane; the provision of a call having an adapter at its outlet end for removable attachment of a sound absorbent tube to the call body.

BRIEF DESCRIPTION OF THE DRAWINGS

In the accompanying drawings:

FIG. 1 is a side elevational view of the present call with a fragment of an attached tube in phantom lines;

FIG. 2 is a top plan view of FIG. 1;

FIG. 3 is a vertical sectional view taken along line 3—3 of FIG. 2;

FIG. 4 is a horizontal sectional view taken downwardly along line 4—4 of FIG. 1;

FIG. 5 is a vertical elevational view taken along line 5—5 of FIG. 1; and

FIG. 6 is a diagrammatic view of the inlet end of the tubular body of the call.

BRIEF DESCRIPTION OF THE PREFERRED EMBODIMENTS

With continuing attention to the drawings wherein applied reference numerals indicate parts similarly hereinafter identified, the reference numeral 1 indicates a tubular body of the call.

An inlet end of the call generally at 2 is defined by a rim 3 of ellipitcal shape in plan view. An upper end segment 4 of tubular body 1 is of tapered configuration as viewed in FIG. 5 to provide convergent wall surfaces 3' of the end segment. A ridge at 5 on the rim projects in an axial direction to provide a surface against which the underside of the user's lower lip L is placed per FIG. 3.

At the remaining or outlet end generally at 9 of tubular body 1 is attached an adapter 6 defining a groove at 7 facilitating snap-on attachment of a sound absorbent tube 8. Sound absorbent tube 8 is conveniently attachable to additionally permit the making of muted calls of lower pitch. Adapter 6 additionally includes a baffle 10 to provide the desired resistance to airflow through tubular body 1. As shown in FIG. 4, the baffle may be of lattice configuration and mounted in the adapter by suitable means.

A backing plate at 11 is detachably rested or supported on a recessed segment 3A of rim 3. For backing plate retention, the rim is shouldered at 3B for engagement with lateral plate edges. Accordingly, the backing plate rests on a first rim segment 3A in a detachable manner to position a tongue 12 in the inlet end of tube 1 with a tongue free edge at 13.

An elastic reed member 15 overlies the backing plate in a spaced manner with the member shown as an elastic membrane having a depending expanse secured against tubular body 1 by an O-ring 19 which seats within a continuous groove 17 formed in the tubular body. Membrane 15 has a span at 16 across inlet end 2 with a free edge at 18 offset from backing plate free edge 13.

To provide a space intermediate the underside of span 16 of the resonant member and the upper surface of backing plate tongue 12, first rim segment 3A on which the backing plate is supported is in a first plane P1 while span supporting rim portion 3 constituting a second rim segment is in a second plane P2. The planes P1–P2 are inclined to and intersect a plane P3 containing the major longitudinal axis of body 1. Accordingly, span 16 of resonant member 15 extends across the inlet end offset or elevated in an axial direction from the upper surface of the backing plate tongue 12 as best viewed in FIG. 3. Elastic resonant member 15 is secured in place by means of an O-ring 19 in a manner so as to have a slight fullness at the span center, in the nature of a dimple, which contributes to optimum vibratory movement of the membrane. It will be apparent that various thicknesses of elastic membrane material may be utilized. Such material commonly known as a dental dam available in a range of thicknesses with the thinner material producing a higher pitch. With attention to free edge 13 of the backing plate, the same is preferably radiused for optimum sound production.

The backing plate may be replaced with a backing plate of different thickness to vary the size of the space at 20 between the plate and span 16 of the membrane for pitch changes.

Baffle 10 has a ring 10A suitably affixed in adapter 6 and serves to restrict airflow through the body to contribute to desired duration of the call by providing sufficient flow reduction. One baffle configuration is shown in FIG. 3 which is of lattice type, other baffle types may include, as for example, an apertured disk.

A flexible skirt at 21 is slit lengthwise and snaps in place about tubular body 1 and conceals a portion of the elastic membrane.

The provision of external groove 7 in the adapter permits a circular end of sound absorbent tube 8 to be readily snapped into place with the tube having a corresponding internal bead for groove engagement. The tube 8 is of sound absorbent material a foot or so in length with partial closing of the tube free end by the user's hand contributing to reproducing certain animal calls.

Planes P1 and P2 each define obtuse, included angles of approximately 110° and 105° with medial plane P3 containing the longitudinal axis of tubular body 1.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. An animal call comprising,
    an elongate tubular body having a first end and a second end,
    a backing plate adjacent said first end and having a tongue with a free edge, and
    elastic reed means also on said body in surface contact with the backing plate and having a span in overlying axially spaced relationship to said backing plate tongue, said span having a free edge defining with said first end of the tubular body an air inlet.

2. The call claimed in claim 1 wherein said reed means is an elastic sheet, a ring member removably mounting said sheet on the tubular body, said elastic sheet jointly supported by said backing plate and said first end of the tubular body.

3. The call claimed in claim 1 wherein said backing plate is detachably mounted on said first end of said tubular body.

4. The call claimed in claim 3 wherein said tubular body includes a rim at said first end said rim having a recessed segment in supporting engagement with said backing plate.

5. The call claimed in claim 1 wherein said first end of the tubular body is of elliptical shape.

6. The animal call claimed in claim 1 additionally including a flexible skirt disposed about said elongate tubular body and a portion of said elastic reed means to protect the latter.

7. An animal call comprising,
    an elongate tubular body having an inlet end defined by a rim structure, said rim structure having a first segment and a second segment,
    a backing plate at said inlet end of the tubular body on said first segment and including a tongue offset inwardly along the longitudinal axis of said body from said inlet end,
    an elastic membrane in place on said rim structure having a span spaced outwardly from the tongue of said backing plate to jointly define with said tongue a space for vibratory movement of the membrane when subjected to an airflow.

8. The call claimed in claim 7 wherein said first rim segment is recessed.

9. The call claimed in claim 7 wherein said rim structure is shouldered for abutting edgewise engagement with the backing plate.

10. The call claimed in claim 8 wherein said rim structure includes a ridge facilitating proper lip placement on the call.

11. The call claimed in claim 7 additionally including an adapter at the outlet end of the tubular body, said adapter having an annular groove facilitating attachment of a sound absorbent length of tubing.

12. The call claimed in claim 11 wherein said adapter includes a baffle.

13. The call claimed in claim 7 wherein said inlet end is of elliptical shape.

14. The call claimed in claim 8 wherein said backing plate and said span are supported respectively by said first rim segment and said second rim segment.

15. The call claimed in claim 8 wherein said first rim segment and said second rim segment lie in separate planes each defining an obtuse angle with a longitudinal medial plane of said tubular body.

16. The animal call claimed in claim 6 additionally including a flexible skirt disposed about said elongate tubular body and concealing a portion of said elastic membrane.

* * * * *